United States Patent
Nielsen et al.

[19]

[11] Patent Number: 5,905,892
[45] Date of Patent: May 18, 1999

[54] ERROR CORRECTING COMPILER

[75] Inventors: Walter Nielsen, Foster City; James Holmlund, Palo Alto, both of Calif.

[73] Assignee: Sun Microsystems, Inc., Palo Alto, Calif.

[21] Appl. No.: 08/625,376

[22] Filed: Apr. 1, 1996

[51] Int. Cl.[6] ....................................................... G06F 9/44
[52] U.S. Cl. .................... 395/705; 395/704; 395/183.14; 395/183.11
[58] Field of Search .................................... 395/701–710, 395/183.14, 185.1, 184.01, 185.01; 371/30, 31, 37.8, 41, 37.2–37.4; 364/280.4, 280, 286, 280.7, 281.3, 266.5, 267, 267.3, 276.4, 267.7, 267.91, 275.5

[56] References Cited

U.S. PATENT DOCUMENTS

| | | | |
|---|---|---|---|
| 5,325,533 | 6/1994 | McInerney et al. ..................... | 395/701 |
| 5,432,942 | 7/1995 | Trainer ..................................... | 395/705 |
| 5,459,868 | 10/1995 | Fong ........................................ | 395/703 |
| 5,519,867 | 5/1996 | Moeller et al. ......................... | 395/677 |
| 5,581,697 | 12/1996 | Gramlich et al. .................. | 395/183.11 |
| 5,598,560 | 1/1997 | Benson ................................... | 395/707 |
| 5,664,206 | 9/1997 | Murow et al. .............................. | 704/8 |
| 5,673,390 | 9/1997 | Mueller ................................ | 395/185.1 |
| 5,675,803 | 10/1997 | Preisler et al. .......................... | 395/704 |

FOREIGN PATENT DOCUMENTS 2240861  8/1991  United Kingdom .

OTHER PUBLICATIONS

Platoff, et al., *An Integrated Program Representation and Toolkit for the Maintenance of C Programs*, Oct. 15, 1991, pp. 129–136, Siemens Corporate Research.

*Primary Examiner*—Tariq R. Hafiz
*Assistant Examiner*—Tuan Q. Dam
*Attorney, Agent, or Firm*—Burns, Doane, Swecker & Mathis; Holland & Hart LLP

[57] ABSTRACT

A software conversion tool that facilitates automated conversion of a software program from one operating environment to another. More particularly, a computer program is compiled using a compiler for a software environment other than a software environment assumed by the computer program. As a result, the compiler produces an error message, and, in response to the error message, source code within the computer program is automatically modified in order to remove a condition causing the error. The software conversion tool acts in concert with the compiler, which may be a standard compiler, to form in effect an error-correcting compiler, i.e., a compiler that instead of only detecting errors and presenting them to the user, is able to actually correct errors such that they do not occur during recompilation.

14 Claims, 3 Drawing Sheets

ERROR CORRECTING COMPILER

BACKGROUND OF THE INVENTION

1. Field of the Invention

The present invention relates to software development tools, in particular to software conversion tools.

2. State of the Art

Software development is a time-consuming and laborious process. Maintaining and reworking previously-written software is at least equally laborious. Many times a need will arise to convert programs written to run in one software environment (i.e., written to interface to one system) to a form that will run in another different software environment. Such a conversion requires finding all language elements in the programs which refer to the old system and replacing them with language elements that refer to the new system. If the programs are large, including several hundreds of thousands or even a million or more lines of code, performing such a conversion manually is an enormous task. Clearly, it is desirable to devise a machine-assisted method of performing such a conversion.

Unfortunately, a simple "search and replace" strategy, in which every occurrence of a specified text string is replaced with a different specified text string, is too simple to provide useful results. In computer languages as in natural languages, the meaning of a particular language element is heavily context-dependent. Sometimes, for example, a local version of a name may appear. Replacing the local version of a name with a global new name results in a program that will not run or will not run correctly.

Therefore, there exists a need for a software tool that automates, to the greatest extent possible, software conversions of the type described.

SUMMARY OF THE INVENTION

The present invention, generally speaking, provides a software conversion tool that facilitates automated conversion of a software program from one operating environment to another. In accordance with one embodiment of the invention, a computer program is compiled using a compiler for a software environment other than a software environment assumed by the computer program. As a result, the compiler produces an error message. In response to the error message, source code within the computer program is automatically modified in order to remove a condition causing the error. The software conversion tool acts in concert with the compiler, which may be a standard compiler, to form in effect an error-correcting compiler, i.e., a compiler that instead of only detecting errors and presenting them to the user, is able to actually correct errors such that they do not occur during recompilation.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

A computer system with which the error correcting compiler may be used will first be described, followed more particularly by a description of the error correcting compiler itself.

Figure 1:
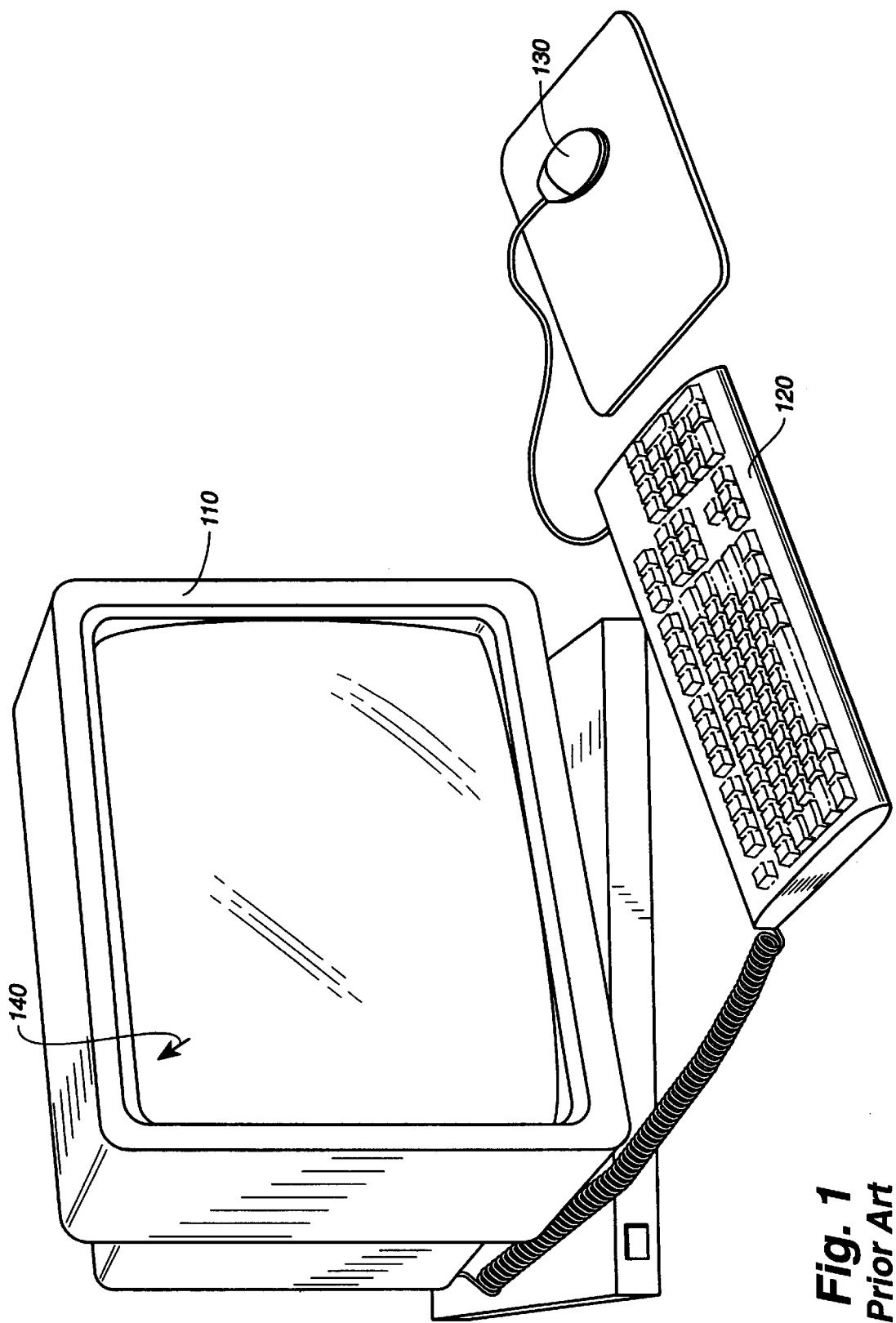
FIG. 1 is a perspective view of a conventional computer workstation with which the present invention may be used.

Referring first to FIG. 1, the error correcting compiler may be used on a computer workstation of the type shown, having a monitor 110, a keyboard 120 and a mouse 130. A mouse cursor 140 appears on the monitor screen and moves as the mouse is moved.

Figure 2:
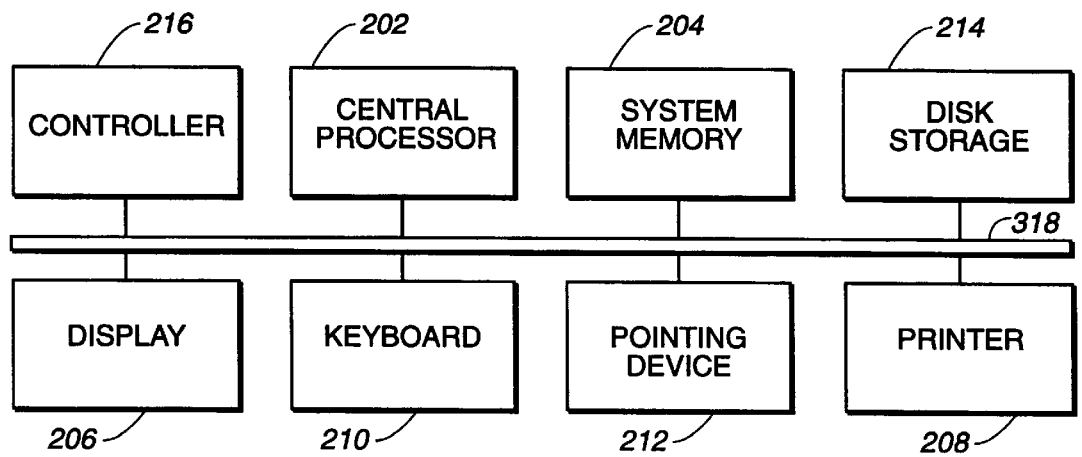
FIG. 2 is a block diagram of a portion of the computer workstation of FIG. 1.

The internal hardware of the computer workstation of FIG. 1 may be represented in simplified block diagram form as shown in FIG. 2. The computer system has a central processor 202, a system memory 204, a display 206, a printer 208, a keyboard 210, a pointing device 212, a disk storage subsystem 214, an I/O controller 216, and interconnecting means 218 such as a system bus.

Having described the hardware environment of the invention, the software components of the error correcting compiler and their interrelation will now be more particularly described with reference to FIG. 3.

The error correcting compiler is in actuality a standard compiler operating in concert with a software conversion program. In one embodiment, the software conversion program is used to convert Objective C programs compatible with one application interface (e.g., NextStep™) to Objective C programs compatible with another application interface (e.g., OpenStep™) and is named "cvtcc", referring to the function performed by the program of converting code from one version of Objective C to another.

Figure 3:
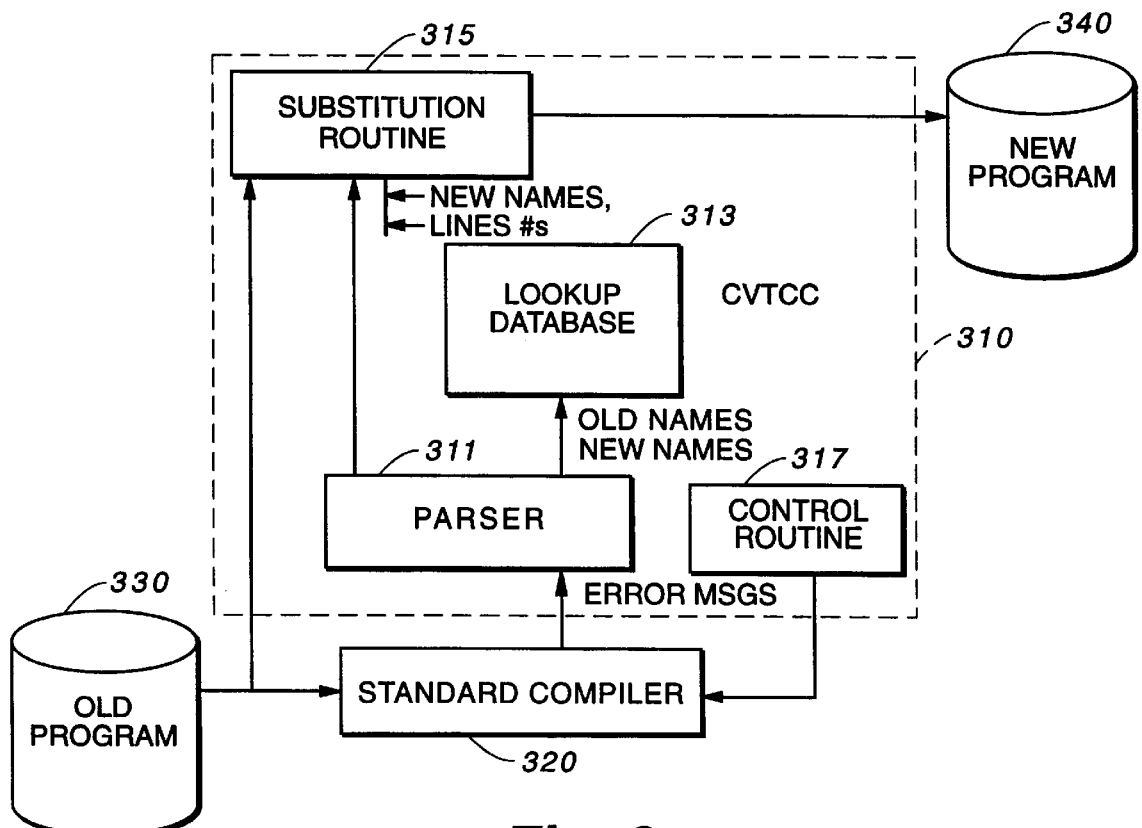
FIG. 3 is block diagram of the error correcting compiler of the present invention.

Referring to FIG. 3, the conversion program 310 has four principal components, a simple parser 311, a database 313, a substitution program 315 and a control program 317. The conversion program 310 operates in concert with a standard compiler 320 to convert an old program 330 that assumes an old software environment into a new program 340 that assumes a new software environment.

The parser 311 and the substitution program 315 together function as an access program. The data base 313 and the access program map old language elements into new. In particular, the parser 311 receives error messages from the compiler 320 and extracts from the error messages old resource names and the file names and line numbers where the old resource names appear. The old names are used to look up corresponding new names in the database 313. The new names, file names and line numbers are then supplied to the substitution program 315, which performs the actual substitution of the new names for the old names. The database is constructed manually by a skilled programmer familiar with both the old software environment and the new software environment.

To convert an old program to a new program, the conversion program 310 is run repeatedly by a control program 317. First, the user calls the compiler, designed or configured to compile to the new system environment instead of the old, to compile the old program. As a result, errors are generated on uses of the old system language elements. Under control of the control program, the error correcting compiler (i.e., the conversion program 310 in cooperation with the compiler 320) iteratively replaces one or more old system elements with corresponding new elements found in the conversion database and recompiles. Thus, the error correcting compiler will continue to call the actual compiler, which will fix the resulting errors until no more errors can be fixed.

Figure 4:
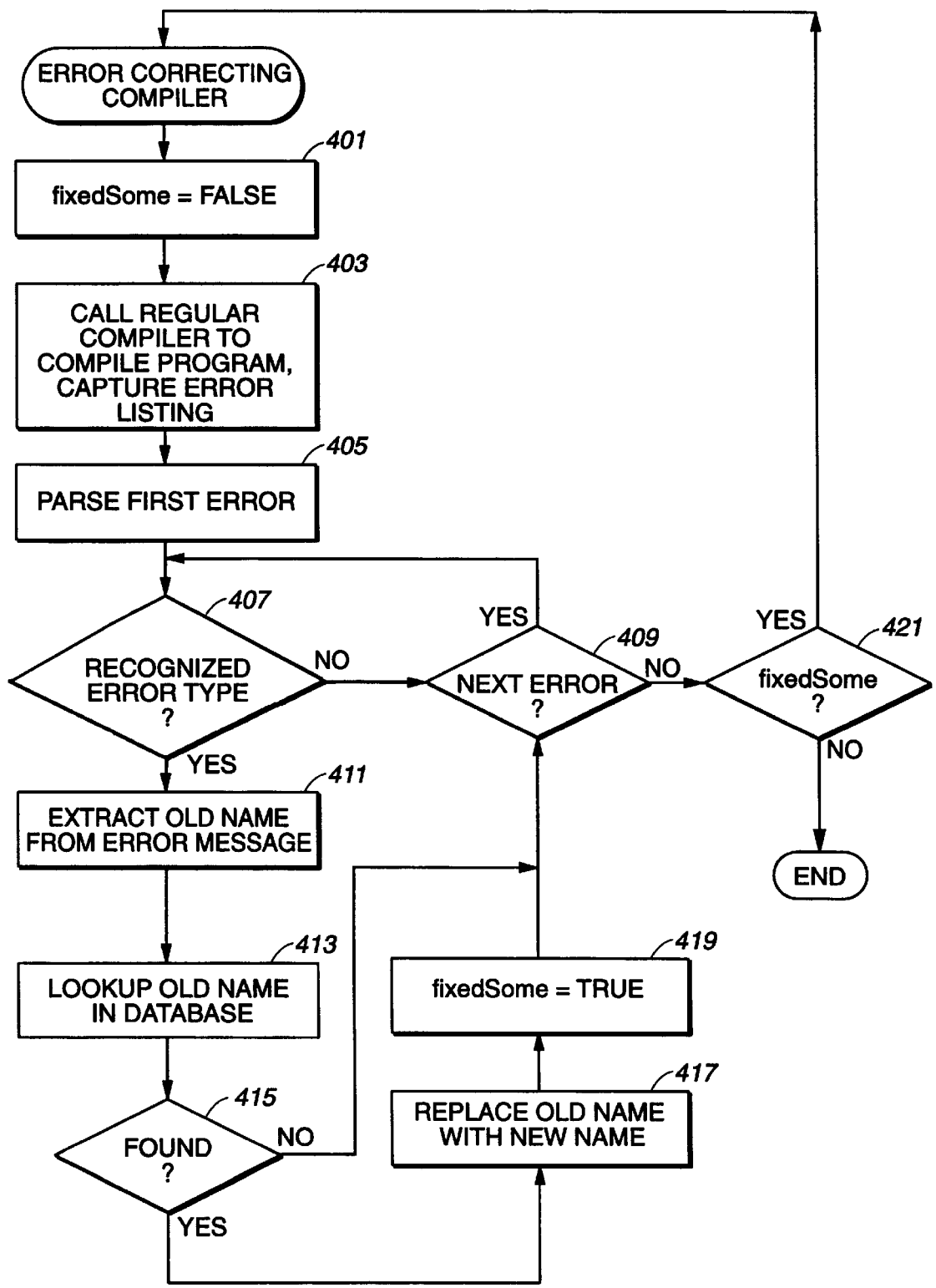
FIG. 4 is a flow diagram illustrating operation of the error correcting compiler of FIG. 3.

Referring more particularly to FIG. 4, when the error correcting compiler begins to run, a flag fixedSome is set to false (Step 401). A regular compiler is then called to compile the program to be converted, and the error listing from the compiler is captured (Step 403). The first error message is then parsed (Step 405). If the error is not of a recognized type (Step 407), then if there is a next error message (Step 409), it is parsed, and so forth.

If the error is of a recognized type, i.e., a type that the error correcting compiler may be able to fix, such as an "identifier not found" message (Step 407), then the name of the old programmatic element is extracted from the error message (Step 411), together with the location (file, line number) of the reference to the old name. The old name is then looked up in the database (Step 413). If the old name is not found in the database (Step 415), then the next error message (if there is one) is processed. If the old name is found in the database (Step 415), then the old name is replaced with the new name found in the database (Step 417), after which the flag fixedSome is set to true (step 419).

The foregoing sequence of operation is performed for all of the error messages until there is no next error message (Step 409). Then, if fixedSome is true (Step 421), the process repeats from the beginning, by resetting fixedSome to false (Step 401) and recompiling the modified program (Step 403).

Operation proceeds in this fashion until the error correcting compiler is unable to fix any more errors, i.e., until fixedSome remains false in Step 421. The error correcting compiler then stops. Errors that the error correcting compiler was not able to fix may then be fixed manually.

The error correcting compiler may be further appreciated from the following Appendices. Appendix A is a listing of a sample database. Appendix B is a screen printout generated during use of the error correcting compiler.

Referring to Appendix A, the database, in the illustrated embodiment, is of a very simple organization. Entries beginning in the first text column are old names to be replaced. If a replacement entry is found in the database, it is entered on the line immediately following, beginning in the second text column. Not all old names have corresponding new names, and vice versa. The symbols "#", "@", "+", "−" have recognized meanings in Objective C.

Referring to Appendix B, to provide a concrete example of operation of the error correcting compiler, a version of the error correcting compiler running on a SparcStation™ computer and running under the SunOS operating system was called on the example program of lines 1–7. Beginning on line 8, the compiler is run, resulting in the four error messages listed on lines 11–14. Beginning on line 16, the conversion program is run using the error message file generated by the compiler. The conversion program first tries to fix include file errors. Hence in lines 21–24, the conversion program reports that it changed the name of the include files as specified in the database. the compiler is then called again to recompile the modified program (line 26). The errors reported in further error messages are then fixed. In line 44, the error correcting compiler reports that it has fixed all the errors it can. The resulting modified program is listed in lines 48–54. Note that "Menu" in the original program has been changed to "NSMenu", and "initTitle" has been changed to "initWithTitle".

It will be appreciated by those of ordinary skill in the art that the invention can be embodied in other specific forms without departing from the spirit or essential character thereof. The foregoing description is therefore considered in all respects to be illustrative and not restrictive. The scope of the invention is indicated by the appended claims, and all changes which come within the meaning and range of equivalents thereof are intended to be embraced therein.

APPENDIX A

```
appkit/Menu.h
 AppKit/NSMenu.h
@interface Menu : Panel
 @interface NSMenu : NSPanel
+ setMenuZone: (NXZone *)aZone;
 + (void)setMenuZone: (NSZone *)aZone;
+ (NXZone *)menuZone;
 + (NSZone *)menuZone;
#- init;
- initTitle: (const char *)aTitle;
 - (id)initWithTitle: (NSString *)aTitle;
// if aTitle is NULL, change it to @""
 - (id) insertItemWithTitle: (NSString *)aString action: (SEL)aSelector keyEquivaient (NSString
- addItem: (const char *)aString action: (SEL)aSelector keyEquivalent: (unsigned short)charCode
 - (id)addItemWithTitle: (NSString *)aString action: (SEL)aSelector keyEquivalent (NSString *)
- setSubmenu:aMenu forItem:aCell;
 - (NSMenuCell *) setSubmenu: (NSMenu *) aMenu forItem: (NSMenuCell *) aCell;
- (NSMenu *)supermenu;
- (NSMenu *)attachedMenu;
- (BOOL) isAttached;
- (BOOL) isTornOff;
- itemList;
 - (NSMatrix *)itemMatrix;
- setItemList: aMatrix;
 - (void) setItemMatrix:(NSMatrix *)aMatrix;
- display;
- sizeToFit;
 - (void)sizeToFit;
- windowMoved: (NXEvent *)theEvent;
- close;
- update;
- setAutoupdate: (BOOL)flag;
```

APPENDIX A-continued

```
- (void) setAutoenablesItems: (BOOL) flag;
 - (BOOL)autoenablesItems;
- findCellWithTag: (int)aTag;
 - (id)cellWithTag: (int)aTag;
- getLocation: (NXPoint *)theLocation forSubmenu:aSubmenu;
 - (NSPoint) locationForSubmenu: (NSMenu *) aSubmenu;
- mouseDown: (NXEvent *)theEvent;
- rightMouseDown:(NXEvent *)theEvent;
#+ new;
+ newTitle: (const char *)aTitle;
 @end
@end
@interface Menu (SubmenuDummyAction)
 @interface NSMenu (NSSubmenuDummyAction)
- submenuAction:sender;
 - (void)submenuAction: (id)sender;
@end
 @end
 @interface NSObject (NSMenuActionResponder)
- (BOOL)validateCell: (id)aCell;
@end
```

APPENDIX B

```
    >>:271 more ~/all.m
1
2   #import <appkit/appkit.h>
3
4   void gus( ) {
5      Menu *fred;
6      [fred initTitle: "abc"];
7   }
8   >>:272 CC ~/all.m -C -I/net/doe/export/o6p/dev8/jjh/nsrt/src/include \
9           -I/usr/openwin/include/X11 -I:/usr/openwin/include
10  "/home/jjh/all.m", line 2: Error: Could not open include file <appkit/appkit.h>.
11  "/home/jjh/all.m", line 5: Error: Menu is not defined.
12  "/home/jjh/all.m", line 5: Error: fred is not defined.
13  "/home/jjh/all.m", line 6: Error: fred is not defined.
14  4 Error(s) detected.
15  >>:273 bin/cvtCC ~/all.m -c -I/net/doe/export/o6p/dev8/jjh/nsrt/src/include \
16          -I/usr/openwin/include/X11 -I/usr/openwin/include
17  Using default fileName: /home/jjh/myaux/src/ConversionTools/appkitdb
18  *** Compiling ***
19  *** Attempting to fix errors ***
20  *** Fixed these msgs ***
21  "/home/jjh/all.m", line 2: Error: Could not open include file <appkit/appkit.h>.
22     — from> source= 'appkit/appkit.h'
23     — to> source= 'AppKit/AppKit.h'
24  *** Fixed some missing include file errors; recompiling ***
25  *** Attempting to fix errors ***
26  *** Fixed these msgs ***
27  *** Fixed these msgs ***
28  "/home/jjh/all.m", line 5: Error: Menu is not defined.
29     — from> file=appkit/Menu.h, source= '@interface Menu : Panel'
30     —    to> file=AppKit/NSMenu.h, source= '@interface NSMenu :NSPanel'
31
32  *** Fixed some errors, recompiling ***
33  *** Attempting to fix errors ***
34  *** Fixed these msgs ***
35  "/home/jjh/all.m", line 6: Warning: Cannot find instance method initTitle: \
36          for class NSMenu:NSPanel:NSWindow:NSResponse:NSObject.
37     — from> file=appkit/Menu.h, source= '- initTitle:(const char *)aTitle;'
38     —    to> file=AppKit/NSMenu.h, source= '- (id)initWithTitle:(NSString *)aTitle;'
39          // if aTitle is NULL, change it to @""
40
41  *** Fixed some errors, recompiling ***
42  *** Attempting to fix errors ***
43
44  *** Fixed all we can in this file ***
45
46
47  >>:274 more ~/all.m
48
49  #import <AppKit/AppKit.h>
50
51  void gus( ) {
```

APPENDIX B-continued

```
52     NSMenu *fred;
53     [fred initWithTitle: "abc"];
54   }
```

What is claimed is:

1. A computer-implemented method of modifying a computer program written to run in a first software environment to produce a modified computer program that runs in a second, different software environment, comprising the steps of:

assembling at least a dictionary database containing database entries including a program identifier appearing in the computer program and its corresponding different program identifier to be used in the modified computer program;

compiling the computer program using a compiler for the second different software environment, the compiler, when an unknown program identifier is encountered, producing an error message containing the unknown program identifier;

in response to the error message, retrieving from the database an entry corresponding to the unknown program identifier; and replacing at least one instance of the unknown program identifier in the computer program with the corresponding different program identifier contained in the entry.

2. The method of claim 1, comprising the further step of recompiling the computer program using a compiler for the second different software environment.

3. The method of claim 2, comprising repeating the steps of claim 2 multiple times.

4. The method of claim 3, comprising repeating the steps of claim 2 until each unknown identifier for which a different program identifier is contained in the database has been replaced by that different program identifier.

5. The method of claim 3, comprising repeating the steps of claim 2 until no entry is found in the database for any error message produced by the compiler.

6. A computer implemented method comprising the steps of:

assembling a dictionary database containing database entries, each entry including a program identifier appearing in a computer program and its corresponding different program identifier to be used in a modified computer program;

compiling the computer program using a compiler for a software environment other than a software environment assumed by the computer program, the compiling program producing an error message; and in response to the error message, accessing the dictionary database to automatically modify the computer program with the corresponding different program identifier in order to remove a condition causing the error.

7. The method of claim 6, wherein the step of modifying comprises:

in response to the error message, retrieving from the database an entry for the unknown program identifier; and replacing at least one instance of the unknown program identifier with a different program identifier contained in the entry.

8. The method of claim 7, comprising the further step of recompiling the computer program using a compiler for the second different software environment.

9. The method of claim 8, comprising repeating the steps of claim 9 multiple times.

10. The method of claim 9, comprising repeating the steps of claim 9 until the compiler does not produce any error messages.

11. The method of claim 9, comprising repeating the steps of claim 9 until no entry is found in the database for any error message produced by the compiler.

12. A computer software system for at least partially converting a program written for a first software environment to a converted program for a second, different software environment, the system comprising:

a compiler for the second, different software environment, the compiler processing the program and producing an error message when an unknown program identifier is encountered in the program;

a parser coupled to the compiler to receive the error message from the compiler and for outputting the unknown program identifier and a location of the unknown program identifier within the program;

a dictionary database containing a database entry including the unknown program identifier and is corresponding different program identifier to be used in the converted program, the dictionary database coupled to the parser to receive the unknown program identifier and outputting in response thereto the corresponding different program identifier; and substitution code coupled to receive the dictionary database output and responsive to the location of the unknown program identifier and to the corresponding different program identifier, the substitution code operative to replace the unknown program identifier with the corresponding different program identifier within the program.

13. The apparatus of claim 12, further comprising control code coupled to the compiler, the parser, the database and the substitution code for causing the system to iteratively replace and recompile to thereby produce the converted program.

14. An article of manufacture comprising a computer usable medium having computer readable program code configured therein, the computer readable code in the article of manufacture comprising:

computer readable program code configured to, in response to an error message from a compiler, retrieve from a database an entry for an unknown program identifier unknown by a compiler; and computer readable program code figured to replace at least one instance of the unknown program identifier with a different program identifier contained in an entry in the database, wherein the different program identifier corresponds to the unknown program identifier contained in the entry.

\* \* \* \* \*

UNITED STATES PATENT AND TRADEMARK OFFICE
CERTIFICATE OF CORRECTION

PATENT NO. : 5,905,892
DATED : May 18, 1999
INVENTOR(S) : Nielsen, et al.

It is certified that error appears in the above-indentified patent and that said Letters Patent is hereby corrected as shown below:

Column 8, Claim 9, Line 13: Change "of claim 9 multiple times" to
--of claim 8 multiple times--

Column 8, Claim 10, Line 15: Change "of claim 9 until" to
--of claim 8 until--

Column 8, Claim 11, Line 18: Change "of claim 9 until" to
--of claim 8 until--

Column 8, Claim 12, Line 33: Change "and is correspond-" to
--and its correspond- --

Signed and Sealed this

Second Day of November, 1999

Attest:

Attesting Officer

Q. TODD DICKINSON

Acting Commissioner of Patents and Trademarks